(12) United States Patent
Mikami

(10) Patent No.: US 8,120,640 B2
(45) Date of Patent: Feb. 21, 2012

(54) VIDEOPHONE APPARATUS

(75) Inventor: Junya Mikami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1101 days.

(21) Appl. No.: 11/935,024

(22) Filed: Nov. 5, 2007

(65) Prior Publication Data

US 2008/0106592 A1    May 8, 2008

(30) Foreign Application Priority Data

Nov. 8, 2006   (JP) ................. 2006-302316

(51) Int. Cl.
*H04N 7/14*    (2006.01)

(52) U.S. Cl. .................. 348/14.16; 348/14.1

(58) Field of Classification Search ........ 348/14.01, 348/14.08, 14.1, 14.15, 14.16, E7.078, E7.079, 348/E7.08, E7.081, E7.083; 455/556.1, 557; 379/93.17

See application file for complete search history.

(56) References Cited

U.S. PATENT DOCUMENTS

| | | | | |
|---|---|---|---|---|
| 6,042,235 A * | 3/2000 | Machtig et al. | ............ | 348/14.16 |
| 6,137,525 A * | 10/2000 | Lee et al. | ................ | 348/E7.078 |
| 7,317,472 B2 * | 1/2008 | Tomisawa et al. | ......... | 348/14.07 |
| 7,806,533 B2 * | 10/2010 | Boute et al. | ................ | 348/14.16 |

FOREIGN PATENT DOCUMENTS

| | | |
|---|---|---|
| JP | 2004135275 A | 4/2004 |
| JP | 2004219742 A | 8/2004 |

* cited by examiner

*Primary Examiner* — Brian Ensey
(74) *Attorney, Agent, or Firm* — Westerman, Hattori, Daniels & Adrian, LLP

(57) ABSTRACT

Between a display of a videophone apparatus and a cover thereof, there are disposed lenses 114, 116, 118 and a half mirror, having sufficiently small areas as compared to the surface areas of the display and the cover. The half mirror enables light from the display to transmit to the cover, and reflects light from the outside, so as to lead to a camera. The camera is disposed at a position at which the light reflected by the half mirror can be imaged. Lenses 114, 116 are disposed in opposite positions sandwiching the half mirror. Light from the display passes through lens 114, transmits through the half mirror, and further, passes through lens 116, so as to be led to the cover. Also, light from the cover passes through lens 116, and is reflected by the half mirror, and then passing through lens 118, so as to be led to the camera.

4 Claims, 7 Drawing Sheets

FIG.2
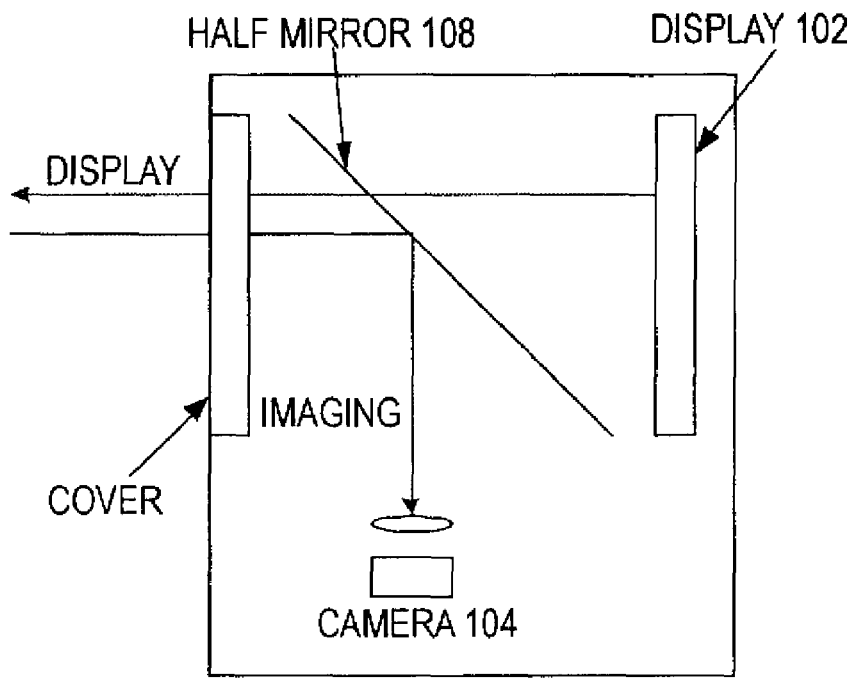
FIG.3
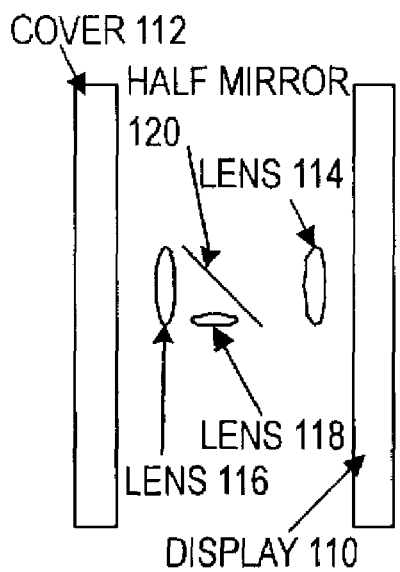

FIG.4
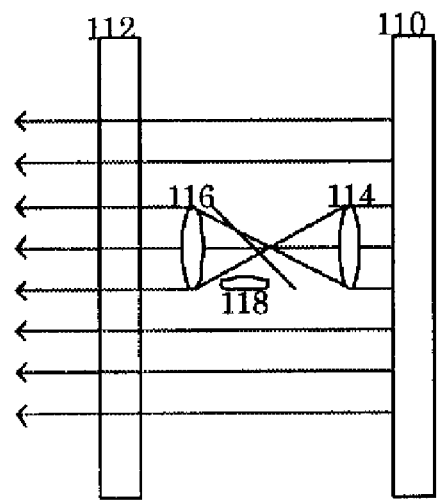
FIG.5
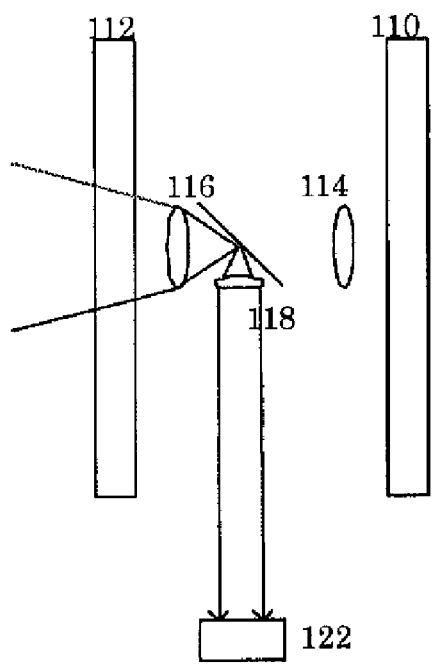

IMAGE FROM THE LEFT HALF MIRROR    IMAGE FROM THE RIGHT HALF MIRROR

VIDEOPHONE APPARATUS

CROSS-REFERENCE TO RELATED APPLICATIONS

This application is based upon and claims the benefit of priority from the prior Japanese Patent Application No. 2006-302316, filed on Nov. 8, 2006, the entire contents of which are incorporated herein by reference.

BACKGROUND OF THE INVENTION

1. Field of the Invention

The present invention relates to a videophone apparatus, and more particularly a small-sized thin videophone apparatus mountable on a small-sized mobile terminal such as a mobile phone terminal.

2. Description of the Related Art

FIG. 1 shows a diagram illustrating an example of the conventional mobile phone terminal with a videophone function. A mobile phone terminal 100 includes a display 102 and a camera 104, and a lens 106 is disposed in a different position from display 102. Camera 104 images, for example, a user face through lens 106, and the imaged image is transmitted to the terminal of the other communication party. At this time, since the face of the other communication party is displayed on display 102, the user of mobile phone terminal 100 makes conversation while viewing display 102.

Namely, when the user looks at the face of the other communication party displayed on display 102, the visual line is directed to display 102, and the user face imaged by camera 104 is displayed on the terminal of the other communication party in such a manner as the user is looking at a different place. As such, because the visual line of the user is directed to the direction of display 102, not directed to the imaging direction, that is, lens 106 of camera 104, the communication parties cannot meet eyes with each other through the display, which produces unnatural dialogue.

Further, when imaging the user himself or herself by use of a camera function of the mobile phone terminal, first, the user confirms his/her own expression, etc. displayed on display 102, and then, it is necessary for the user to shift the visual line to the direction of camera lens 106 at the time of being imaged. As such, the videophone apparatus has been required to have a configuration to make the visual line at the time of viewing the display consistent with the visual line at the time of imaging.

FIG. 2 shows a diagram illustrating an exemplary to configuration of a lens & half mirror portion in the conventional videophone apparatus enabling consistent visual lines. A half mirror 108 is disposed in front of display 102, so that half mirror 108 can transmit light through the optical path on the display side of display 102, and also reflects the optical path on the imaging side, so as to lead the light to the direction of lens 106 and camera 104. Thus, it becomes possible to make the visual line for viewing display 102 consistent with the visual line directed to lens 106.

Also, in the official gazette of the Japanese Unexamined Patent Publication No. 2004-135275 (hereafter referred to as Patent document 1), there is disclosed a device in which display on a display unit is reflected by a mirror, and a semi-transparent window to enable camera imaging is disposed on a portion of the mirror. By making conversation while viewing the display reflected by the mirror, the user can obtain consistent visual lines.

Further, in the official gazette of the Japanese Unexamined Patent Publication No. 2004-219742 (hereafter referred to as Patent document 2), there is disclosed a display device having a camera imaging window disposed on a screen for displaying a projected image. With the above configuration, consistent visual lines can be obtained when the user makes conversation while viewing the display projected on the screen.

However, according to the configuration shown in FIG. 2, although inconsistent visual lines can be eliminated, it is necessary to provide half mirror 108 corresponding to the overall display size of display 102, and according to the size thereof, a sufficient depth is required for the device. This becomes an obstacle to small-sized thin videophone apparatus required when incorporating the videophone apparatus into a mobile phone terminal.

Further, in Patent document 1, because it is necessary to allow the display on the display unit to be reflected by the mirror, the shape of the videophone apparatus is restricted to have a structure so that the display may have a substantial angle from the mirror (for example, a mobile phone terminal of folding type). In addition, at the time of use, since the user looks into an image reflected by the mirror, the use feeling greatly differs as compared to the conventional mobile phone terminal. As a result, in contrast to a direct viewing type of the display, the handling convenience is largely degraded.

Also, in Patent document 2, as the display method, a projection method is applied, and other display methods than the projection method is not applicable. Accordingly, there is a problem that the method concerned is not applicable to liquid crystal display which is a mainstream today. In addition, because it is necessary to position a projection portion in front of the projection screen, the shape of the videophone apparatus is restricted (for example, a mobile phone terminal of folding type).

SUMMARY OF THE INVENTION

Accordingly, it is an object of the present invention to provide a small-sized thin videophone apparatus in the videophone apparatus, enabling consistent visual lines during dialog with the other communication party.

Further, it is an object of the present invention to provide a small-sized thin videophone apparatus enabling consistent visual lines during dialog with the other communication party, in the videophone apparatus having a liquid crystal display or an organic EL display, irrespective of a display system.

As a first configuration of the videophone apparatus according to the present invention to achieve the aforementioned objects, in the videophone apparatus transmitting an image imaged by a camera and displaying the received image on a display, the videophone apparatus includes: a cover portion covering the surface of the display with a predetermined interval apart from the display; a half mirror being disposed inside the cover portion and on the surface of the display, and having an area smaller than the surface area of the display; a first lens of a convex lens being disposed between the display and the half mirror, and leading a portion of light corresponding to the display image to the half mirror; a second lens of a convex lens being disposed between the cover portion and the half mirror, and leading light transmitted through the half mirror to the cover portions and also leading light from outside the cover portion to the half mirror; and a third lens being disposed between the second lens and the half mirror, and leading light incident from the outside the cover portion and reflected by the half mirror, to the camera.

As a second configuration of the videophone apparatus according to the present invention, in the aforementioned first configuration, the videophone apparatus further includes a filter attenuating the luminance of the light reaching the cover portion, without being transmitted through the half mirror, among the light corresponding to the display image, to a luminance of the light being transmitted through the half mirror.

As a third configuration of the videophone apparatus according to the present invention, in the aforementioned first configuration, the videophone apparatus further includes an actuator for making the half mirror movable.

As a fourth configuration of the videophone apparatus according to the present invention, in the aforementioned first configuration, the videophone apparatus further includes: two sets of optical units each formed of the combination of the half mirror, the first lens, the second lens and the third lens, and the two sets of the optical units are disposed on the surface of the display inside the cover portion, mutually with a predetermined interval apart in the horizontal direction, and the third lenses of the optical units lead the light reflected by the halt mirrors of the optical units respectively to the left half area and the right half area of an imaging device provided on the camera.

Further scopes and features of the present invention will become more apparent by the following description of the embodiments with the accompanied drawings.

BRIEF DESCRIPTION OF THE DRAWINGS

FIG. 2 shows a diagram illustrating an exemplary configuration of a lens & half mirror portion of the conventional videophone apparatus enabling consistent visual lines.

FIG. 3 shows a diagram illustrating a first exemplary configuration of a lens & half mirror portion of a videophone apparatus, according to an embodiment of the present invention.

FIG. 4 shows a diagram illustrating an optical path (optical path on the display side) from a liquid crystal display 110.

FIG. 5 shows a diagram illustrating an optical path (optical path on the imaging side) to lead the light from a cover 112 to a camera 122.

DETAILED DESCRIPTION OF THE PREFERRED EMBODIMENTS

Figure 1:
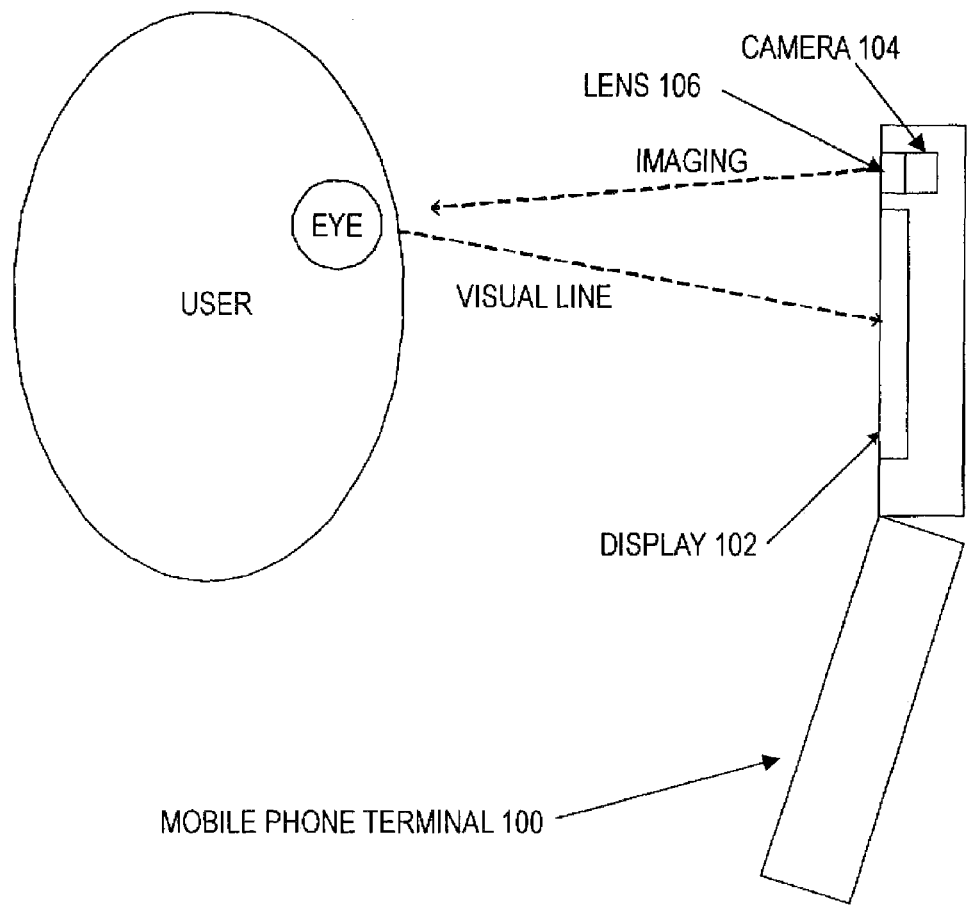
FIG. 1 shows a diagram illustrating an example of the conventional mobile phone terminal with a videophone function.

The preferred embodiments of the present invention are described hereinafter referring to the charts and drawings.

However, it is to be noted that the technical scope of the present invention is not limited to the embodiments described below.

FIG. 3 shows a diagram illustrating a first exemplary configuration of a lens & halt mirror portion of a videophone apparatus, according to an embodiment of the present invention. The videophone apparatus according to the present invention is, for example, a mobile phone terminal having a built-in camera, and by means of the communication function of the mobile phone terminal, the communication of an image data imaged by the camera is carried out. FIG. 3 is a cross-sectional view of a lens & half-mirror portion of the mobile phone terminal, and the lens & half mirror portion includes lenses 114, 116, 118 and a half mirror 120. Between a display 110 of the mobile phone terminal and a cover (formed of, for example, a glass material) 112 being disposed with an interval between to display 110 so as to protect the above display (for example, of liquid crystal), lenses 114, 116, 118 and half mirror 120, having a sufficiently small area as compared to the surface areas of display 110 and cover 112, are disposed.

Half mirror 120 allows light from display 110 to transmit to the cover, and also allows light from cover 112 to reflect, so as to lead to camera 122. Camera 122 is disposed in a position in which the reflected light from half mirror 120 can be imaged.

FIG. 4 shows a diagram illustrating an optical path (optical path on the display side) from liquid crystal display 110, and FIG. 5 shows a diagram illustrating an optical path (optical path on the imaging side) to lead the light from cover 112 to camera 122. Lenses 114, 116 are disposed at opposite positions to sandwich half mirror 120. As shown in FIG. 4, light from display 110 passes through lens 114, and transmits through half mirror 120, and further the light passes through lens 116 and is led to cover 112. The light passing through lenses 114, 116 is displayed as an image having a magnification of one. Further, as shown in FIG. 5, the light from cover 112 passes through lens 116 and is reflected by half mirror 120, and then the light passes through lens 118 and is led to camera 122.

Because half mirror 120 has a sufficiently small area as compared to each surface area of display 110 and cover 112, in order to efficiently collect the reflected light from half mirror 120, it is necessary to dispose lens 118 as close as possible to half mirror 120. Accordingly, as shown in FIG. 4, lens 118 becomes disposed on the surface of display 110, and the shadow of lens 118 is undesirably displayed on cover 112 because of the light from display 110.

To cope therewith, lens 118 is disposed between lenses 114, 116 which are convex lenses disposed on one and the other sides of half mirror 120, respectively. By means of the refractive effects of lenses 114, 116, the optical path is narrowed as shown in FIG. 4, and by disposing lens 118 between lens 114 and lens 116 on the optical path before being narrowed, it becomes possible to avoid the shadow of lens 118 from being imaged on the cover.

Further, lens 114 is a convex lens having a small diameter, with a viewing angle to obtain an imaging range of at least the range of a user face or greater, and in order to lead the image having the above viewing angle to camera 122 positioned apart, lenses 114, 118, which are convex lenses, are combined. Lenses 114, 116, 118 are microlenses having sizes of the order of the size of the half mirror (of the order of a few millimeters) or smaller (a few millimeters or less).

Additionally, through the optical path passing through lens 114 and lens 116, the image is reversed upside down. Therefore, by obtaining in advance the range of an image portion on display 110 corresponding to the optical path passing through lens 114 and lens 116, the image in the above range is generated upside down beforehand at an image generation stage. With this, after passing through lens 114 and lens 116, the image is displayed as a normal image.

Figure 6:
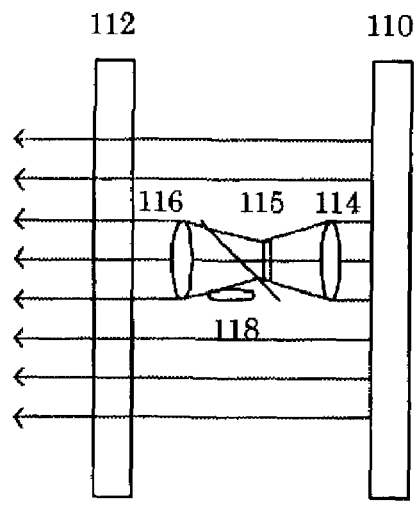
FIG. 6 shows a diagram illustrating a second exemplary configuration of a lens &half mirror portion of a videophone apparatus, according to an embodiment of the present invention.

FIG. 6 shows a diagram illustrating a second exemplary configuration of the lens & half mirror portion of the videophone apparatus, according to the embodiment of the present invention. In the second exemplary configuration, it is configured to dispose a concave lens 115 between lens 114 and lens 116 (in the figure, between half mirror 120 and lens 114), so that an image of a portion passing through lens 114 and lens 116 is not reversed upside down. With this, in digital image processing at the image generation stage, it becomes unnecessary to reverse upside down beforehand to generate the image portion corresponding to the optical path passing through lens 114 and lens 116. The digital image processing is realized through software processing by means of an image processing processor (for example, DSP) embedded in the videophone apparatus.

Figure 7:
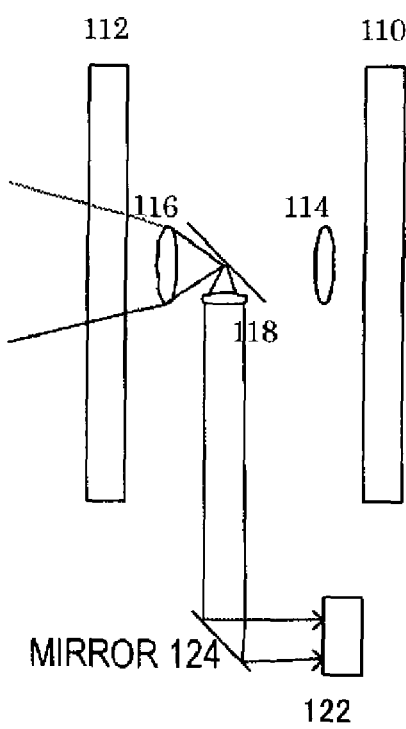
FIG. 7 shows a diagram illustrating a third exemplary configuration of a lens & half mirror portion of a videophone apparatus, according to an embodiment of the present invention.

FIG. 7 shows a diagram illustrating a third exemplary configuration of the lens & half mirror portion of the videophone apparatus, according to an embodiment of the present invention. In the third exemplary configuration, it is configured to set the mounting direction of camera 122 to the same as the display direction (i.e. the direction facing in front), and light being incident from lens 118 is reflected by a mirror 124, and led to camera 122. Since a camera embedded in the conventional mobile phone terminal has the same direction as the display direction, the conventional camera components can be used without modification, so that a manufacturing cost increase can be suppressed.

Figure 8:
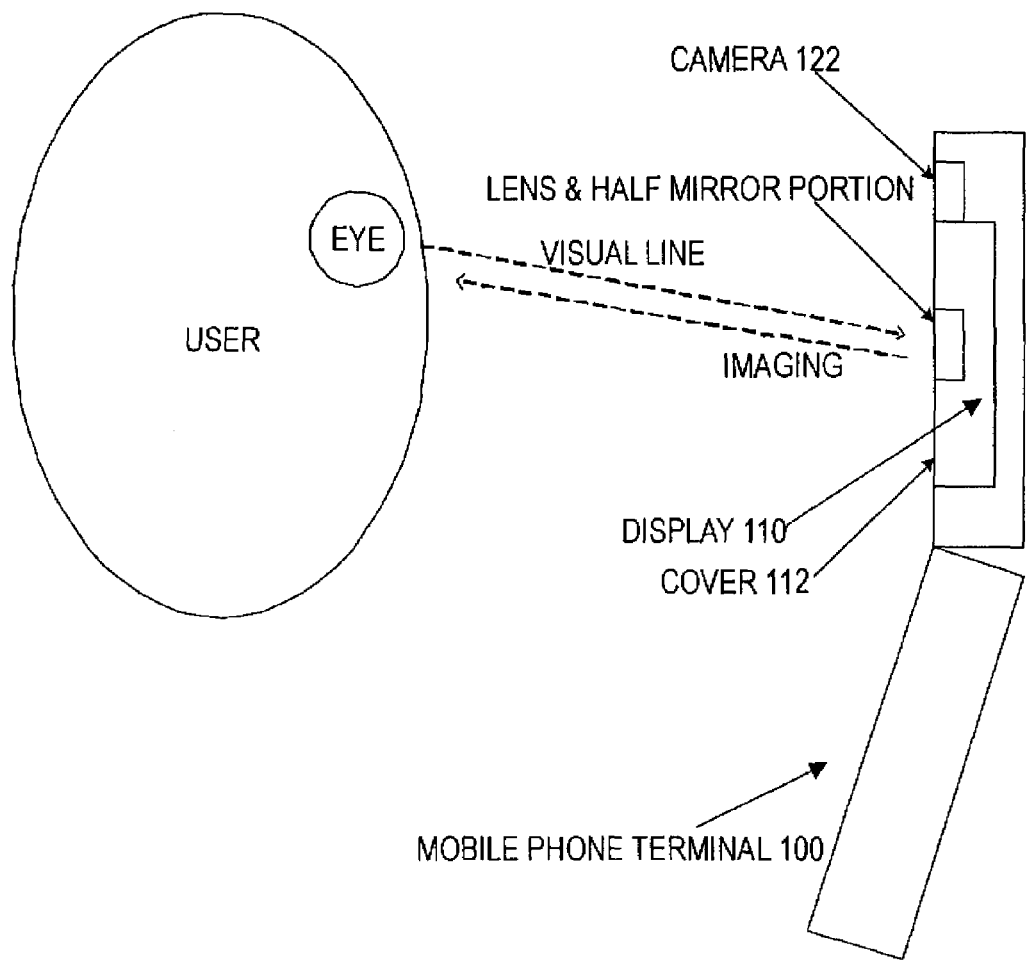
FIG. 8 shows a diagram illustrating a mobile phone terminal, which is a videophone apparatus, according to an embodiment of the present invention.

FIG. 8 shows a diagram illustrating a mobile phone terminal, which is a videophone apparatus according to an embodiment of the present invention. Inside cover 112 of display 110 of the mobile phone terminal, there is embedded the lens & half mirror portion (namely, the combination of half mirror 120 with lenses 114, 116 and 118), which is characteristic in the present invention described in FIGS. 3 through 7. Accordingly, the visual line of the user being imaged becomes directed to the direction of display 110, and thus, the user can make natural video conversation while meeting eyes with the other party. Preferably, the lens & half mirror portion is mounted on a position in the vicinity of eye positions expected to be positioned when the face of the other party is displayed on display 110. By this, consistent visual lines can be obtained.

Even when the user images himself or herself, the user can image an image having a visual line directed toward the camera and consistent with the imaging direction, while the user is looking at the user's own expression displayed on display 110.

Figure 9:
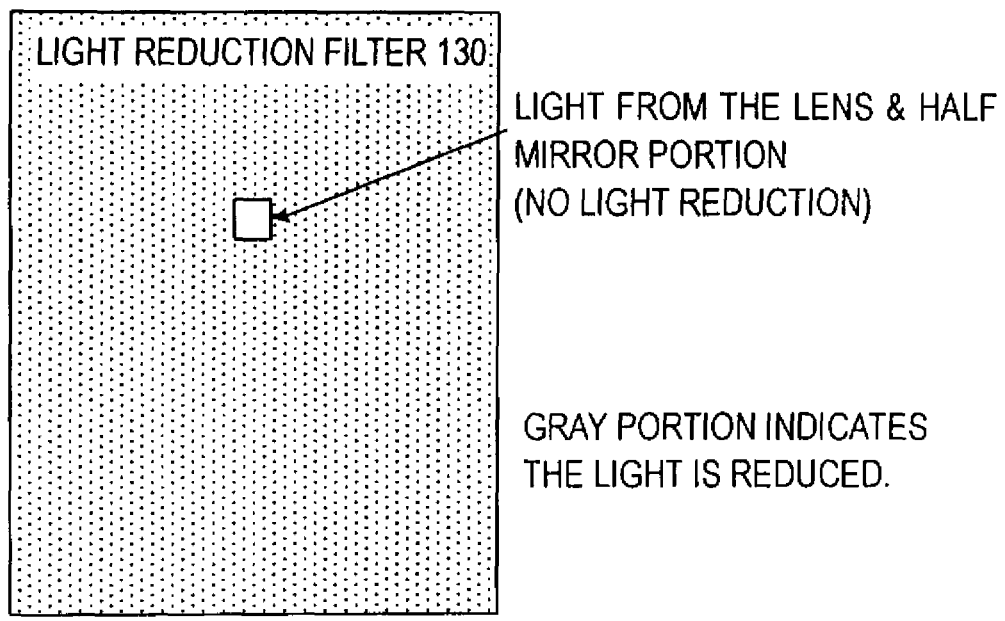
FIG. 9 shows a diagram illustrating a light reduction filter disposed on a display 110.

FIG. 9 shows a diagram illustrating a light reduction filter disposed on display 110. In regard to the light from display 110, the light passing through the lens & half mirror portion has different luminance from the rest of light. The reason is that the luminance of the light passing through the lens & half mirror portion is attenuated.

Accordingly, to make the luminance therebetween uniform, it may be possible to mount on display 110 a light reduction filter 130 for attenuating the luminance of the light not passing through the lens & half mirror portion so as to adjust to the luminance of the light passing therethrough. For example, light reduction filter 130 is stuck on the internal face of cover 112.

Further, in place of light reduction filter 130, it may be possible to process to attenuate the light luminance not passing through the lens & half mirror portion, through digital image processing by means of a built-in DSP. Oppositely, using the digital image processing, it may also be possible to relatively amplify the light luminance which passes through the lens & half mirror portion.

Figure 10:
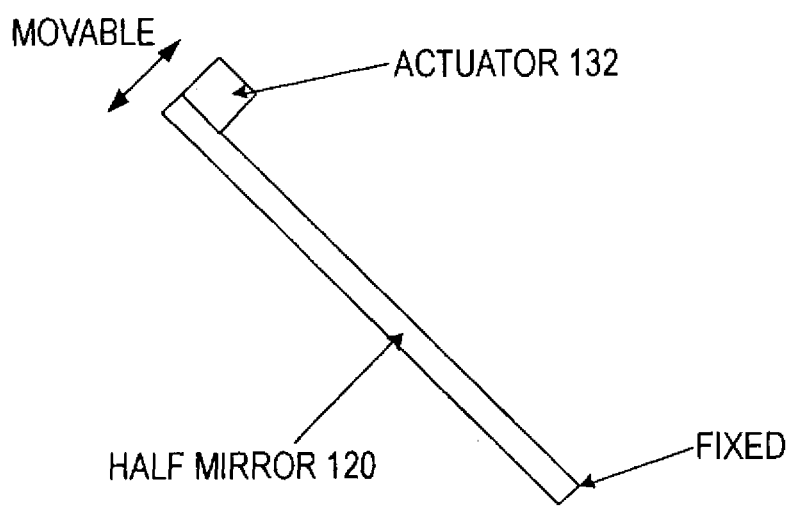
FIG. 10 shows a diagram illustrating a configuration to enable a half mirror 120 to be movable.

FIG. 10 shows a diagram illustrating a configuration to allow half mirror 120 to be movable. As shown in the figure, one end of half mirror 120 is fixed, while on the other end, an actuator 132 constituted of a piezoelectric device is attached. Actuator 132 is fixed on a non-illustrated fixed end, and when actuator 132 is moved by a voltage applied on actuator 132, the direction of half mirror 120 is shifted following the above movement. By making half mirror 120 movable, the imaging area range is varied, so as to enable adjustment to an optimal imaging area.

Actuator 132 to be attached is not limited to one, but, for example, a plurality of actuators may be attached so as to enable both panning (horizontal direction) and tilting (vertical direction) movements.

Figure 11:
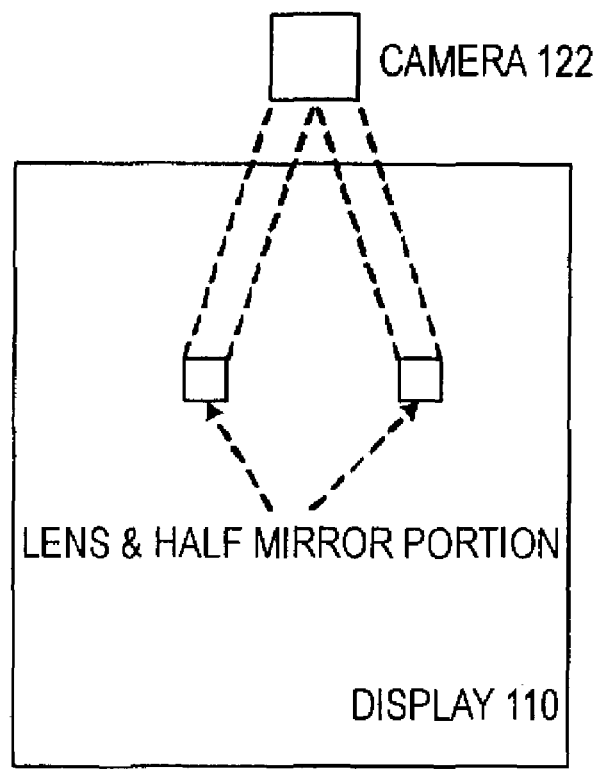
FIG. 11 shows a diagram illustrating a configuration enabling stereo imaging.
Figure 12:
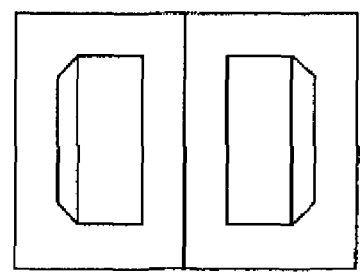
FIG. 12 shows a diagram illustrating a configuration enabling stereo imaging.

FIGS. 11 and 12 show diagrams explaining a configuration enabling stereo imaging. As shown in FIG. 11, inside cover 112, two sets of lens & half mirror portions are disposed apart at a predetermined interval in the horizontal direction. With the angle adjustment of both half mirrors 120, a configuration is made to lead the optical paths on the imaging side to camera 122. More specifically, as shown in FIG. 12, light from either one half mirror is made incident on the left (right) half area of an imaging plane of an imaging device (CCD, CMOS, etc.) mounted on camera 122, while light from the other half mirror 120 is made incident on the other half area.

With this, a stereo image can be imaged using a single camera 122, and by use of known processing and operation, the user can view as a three-dimensional image.

According to the present invention, when a user is viewing a display, the user face can be imaged from a position on the visual line directed to the display direction, and thus, the user can make natural videophone conversation while meeting eyes with the other party.

With the provision of a small-sized half mirror, which is sufficiently smaller than the surface area of the display and disposed inside the surface of the display, so as to perform imaging, small-sized thin videophone apparatus can be realized, which is applicable to a mobile phone terminal.

When a small-sized half mirror is used, it is necessary to dispose a lens for leading light reflected from the half mirror inside the surface of a display. With a structure of disposing a convex lens on the opposite side of the half mirror in the direction of the display indication, it becomes possible to prevent the shadow of the above lens from being displayed on the display surface.

Since any display type for use in a videophone apparatus may be applicable, such as liquid crystal display and organic EL display, and also, any camera type may be applicable (such as CCD and CMOS), the existing displays and cameras may be used intact. Accordingly, it is possible to suppress a cost increase.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A videophone apparatus transmitting an image imaged by a camera and displaying the received image on a display, comprising:

a cover portion covering the surface of the display with a predetermined interval apart from the display;

a half mirror being disposed inside the cover portion and on the surface of the display, and having an area smaller than the surface area of the display;

a first lens of a convex lens being disposed between the display and the half mirror, and leading a portion of light corresponding to the display image to the half mirror;

a second lens of a convex lens being disposed between the cover portion and the half mirror, and leading light transmitted through the half mirror to the cover portion, and also leading light from outside the cover portion to the half mirror; and a third lens being disposed between the second lens and the half mirror, and leading light incident from the outside the cover portion and reflected by the half mirror to the camera.

2. The videophone apparatus according to claim 1, further comprising:

a filter attenuating the luminance of the light reaching the cover portion, without being transmitted through the half mirror, among the light corresponding to the display image, to a luminance of the light being transmitted through the half mirror.

3. The videophone apparatus according to claim 1, further comprising:

an actuator for making the half mirror movable.

4. The videophone apparatus according to claim 1, further comprising:

two sets of optical units each formed of the combination of the half mirror, the first lens, the second lens and the third lens, wherein the two sets of the optical units are disposed on the surface of the display inside the cover portion, mutually with a predetermined interval apart in the horizontal direction, and wherein the third lenses of the optical units lead the light reflected by the half mirrors of the optical units respectively to the left half area and the right half area of an imaging device provided on the camera.

\* \* \* \* \*